US012116291B1

(12) United States Patent
Kimball, Jr.

(10) Patent No.: US 12,116,291 B1
(45) Date of Patent: Oct. 15, 2024

(54) WATER RESTORATION SYSTEM

(71) Applicant: Kimball Water & Energy LLC, Jacksonville, FL (US)

(72) Inventor: Phyl Miller Kimball, Jr., Jacksonville, FL (US)

(73) Assignee: Kimball Water & Energy LLC, Jacksonville, FL (US)

( * ) Notice: Subject to any disclaimer, the term of this patent is extended or adjusted under 35 U.S.C. 154(b) by 0 days.

(21) Appl. No.: 18/668,672

(22) Filed: May 20, 2024

Related U.S. Application Data

(60) Provisional application No. 63/468,044, filed on May 22, 2023.

(51) Int. Cl.
*C02F 1/28* (2023.01)
*B01D 24/28* (2006.01)
(Continued)

(52) U.S. Cl.
CPC .............. *C02F 1/281* (2013.01); *C02F 1/285* (2013.01); *C02F 1/74* (2013.01); *C02F 3/28* (2013.01);
(Continued)

(58) Field of Classification Search
CPC .. C02F 1/281; C02F 1/285; C02F 1/74; C02F 3/28; C02F 3/08; C02F 3/085; C02F 3/14; C02F 3/24; C02F 2003/001; C02F 2101/103; C02F 2101/105; C02F 2101/12; C02F 2101/14; C02F 2101/16; C02F 2101/20; C02F 2101/40; C02F 2103/001; C02F 2103/007; C02F 2103/08; B01D 24/28; B01D 24/36
USPC ....... 210/615, 616, 617, 150, 151, 620, 621, 210/622, 220, 221.1, 221.2, 602, 170.01, 210/170.03, 170.09, 170.1, 170.11, 747.1, 210/747.2, 747.3, 747.5, 903, 906, 909, 210/911, 912, 915
See application file for complete search history.

(56) References Cited

U.S. PATENT DOCUMENTS 4,043,771 A * 8/1977 Anand ...................... C02F 3/26
261/36.1
7,731,841 B1 * 6/2010 Tennyson, Jr. ........ B01F 23/234
210/151

FOREIGN PATENT DOCUMENTS

| CN | 107285558 A * | 10/2017 | ................ C02F 9/00 |
| WO | WO-2016035079 A1 * | 3/2016 | ........ B01F 15/00571 |
| WO | WO-2019040561 A1 * | 2/2019 | |

OTHER PUBLICATIONS

Machine-generated English translation of CN 107285558, generated on Aug. 1, 2024.*

* cited by examiner

*Primary Examiner* — Fred Prince
(74) *Attorney, Agent, or Firm* — Michele L. Lawson; Smith & Hopen, P.A.

(57) ABSTRACT

A water restoration system is presented. The system includes a filtration chamber disposed proximate to or within a water basin, such as a watershed basin, to continuously filter contaminants from the water basin without relying on a rain event. The filtration chamber includes a reaction chamber and an aeration and mixing chamber, such that the water removed from the basin interacts with filtration media within the reaction chamber, and such that the filtration media mixes with the water (while the water is aerated) within the aeration and mixing chamber. As a result, water from the basin is continuously filtered through the water restoration system to reduce the concentration of contaminants, such as phosphorus and nitrogen, from the water basin.

20 Claims, 9 Drawing Sheets

(51) Int. Cl.
   *B01D 24/36*   (2006.01)
   *C02F 1/74*    (2023.01)
   *C02F 3/08*    (2023.01)
   *C02F 3/14*    (2023.01)
   *C02F 3/24*    (2023.01)
   *C02F 3/28*    (2023.01)
   *C02F 3/00*        (2023.01)
   *C02F 101/10*      (2006.01)
   *C02F 101/12*      (2006.01)
   *C02F 101/14*      (2006.01)
   *C02F 101/16*      (2006.01)
   *C02F 101/20*      (2006.01)
   *C02F 103/00*      (2006.01)
   *C02F 103/08*      (2006.01)

(52) U.S. Cl.
   CPC .............. *B01D 24/28* (2013.01); *B01D 24/36* (2013.01); *C02F 2003/001* (2013.01); *C02F 3/08* (2013.01); *C02F 3/085* (2013.01); *C02F 3/14* (2013.01); *C02F 3/24* (2013.01); *C02F 2101/103* (2013.01); *C02F 2101/105* (2013.01); *C02F 2101/12* (2013.01); *C02F 2101/14* (2013.01); *C02F 2101/16* (2013.01); *C02F 2101/20* (2013.01); *C02F 2101/40* (2013.01); *C02F 2103/001* (2013.01); *C02F 2103/007* (2013.01); *C02F 2103/08* (2013.01)

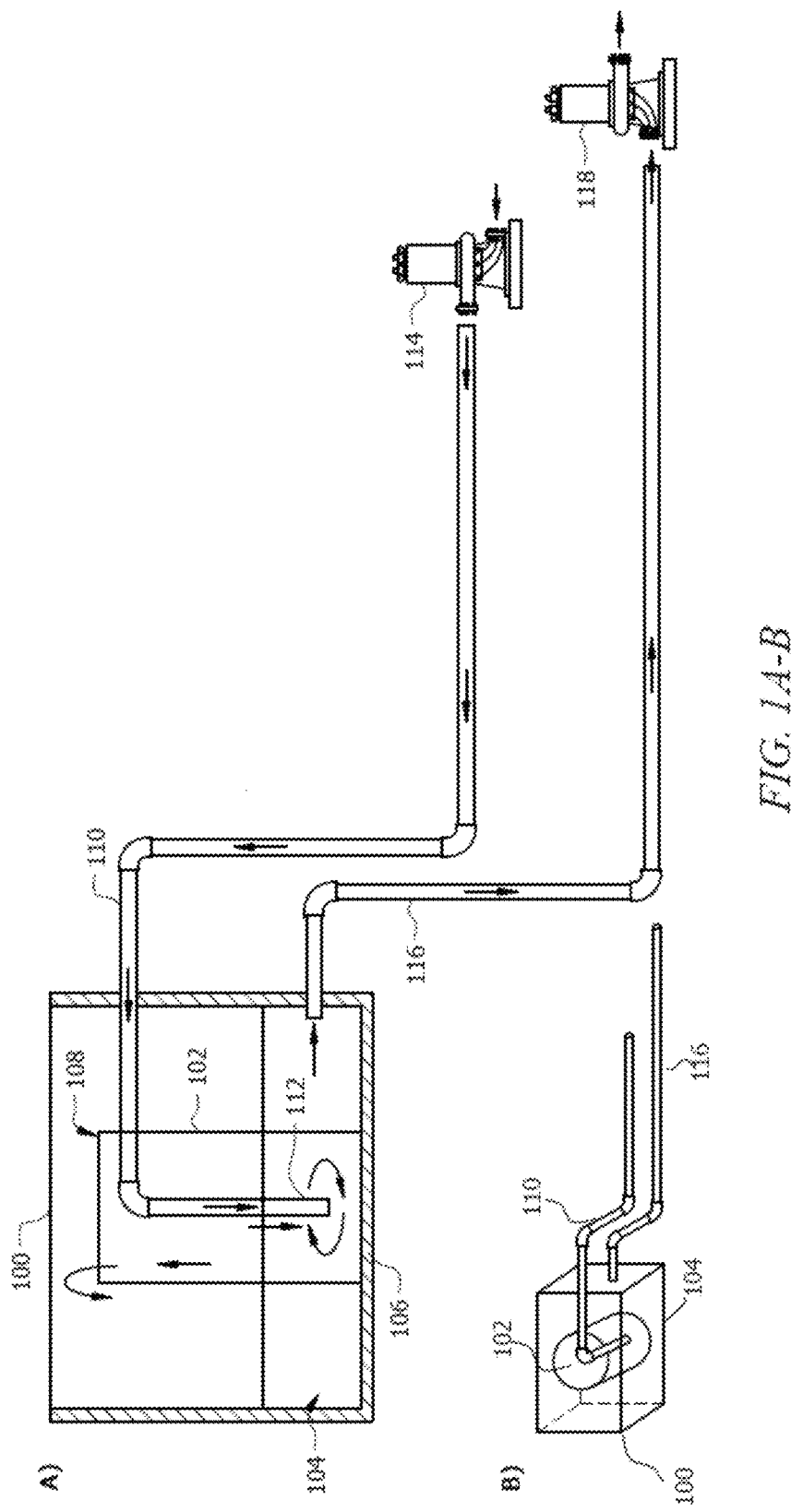
FIG. 1A-B

| Basin | Acres | CuFt/Acre | Depth ft. | Total CuFt | Gallons | # Chambers | Gallons treated/year | Basin turnovers/year | TP Lbs./year removed | TN Lbs./year removed |
|---|---|---|---|---|---|---|---|---|---|---|
| 1 | 2.21 | 43,560 | 5 | 481,338 | 3,600,408 | 2 | 168,192,000 | 47 | 684 | 628 |
| 2 | 1.81 | 43,560 | 5 | 394,218 | 2,948,751 | 1 | 84,096,000 | 23 | 342 | 314 |
| 3 | 1.52 | 43,560 | 5 | 331,056 | 2,476,299 | 1 | 84,096,000 | 23 | 342 | 314 |
| 4 | 2.42 | 43,560 | 5 | 527,076 | 3,942,528 | 2 | 168,192,000 | 47 | 684 | 628 |
| 5 | 2.77 | 43,560 | 5 | 603,306 | 4,512,729 | 2 | 168,192,000 | 47 | 684 | 628 |
| 6 | 1.74 | 43,560 | 5 | 378,972 | 2,834,711 | 1 | 84,096,000 | 23 | 342 | 314 |
| 7 | 2.89 | 43,560 | 5 | 629,442 | 4,708,226 | 3 | 252,288,000 | 70 | 1,026 | 942 |
| 8 | 0.31 | 43,560 | 5 | 67,518 | 505,035 | 1 | 84,096,000 | 23 | 342 | 314 |
| 9 | 0.34 | 43,560 | 5 | 74,052 | 553,909 | 1 | 84,096,000 | 23 | 342 | 314 |
| Total | 16.01 | | | 3,486,978 | 26,082,595 | 14 | 1,177,344,000 | | 4,788 | 4,397 |

FIG. 6

WATER RESTORATION SYSTEM

CROSS REFERENCE TO RELATED APPLICATIONS

This application is a nonprovisional of and claims priority to U.S. Provisional Application Ser. No. 63/468,044, entitled "Water Restoration System", filed May 22, 2023, the contents of which are hereby incorporated by reference into this disclosure.

FIELD OF INVENTION

This invention relates, generally, to water restoration systems. More specifically, it relates to a water restoration system, such as for a watershed basin, including a filtration media disposed within a filtration chamber, such that the filtration chamber infuses the filtration media into water to form treated water that is reintroduced into a water basin.

BACKGROUND OF THE INVENTION

Freshwater sources and basins, as well as saltwater and brackish water basins, are crucial to healthy and functional ecosystems, for organisms such as humans, animals, and plants, as well as for resources usable by organisms participating in the ecosystems. However, many water sources and basins include contaminants that degrade water quality, consequently negatively impacting the organisms coming into contact with the water sources. For example, excess levels of phosphorus and nitrogen in a water source contribute to algae bloom events, including red tide, which can cause health defects in organisms exposed to the algae. Specifically relating to watersheds and similar basins, phosphorus and nitrogen contaminants are continuously introduced into the water basins due to stormwater runoff, in which the stormwater drained into the water basins includes contaminants from the surrounding drainage area (such as roads, trails, forests, and similar areas surrounding a water basin).

Attempts have been made to introduce mitigation measures for water basin contamination. For example, some existing technologies include underground filtration chambers that are installed proximate to a water basin, with the filtration chambers designed to receive and filter an amount of water prior to entering the water basin. Similarly, catch basin filtration technologies exist to capture water for filtration prior to integration into the water basin. However, these filtration systems suffer from poor filtration quality, particularly during heavy or sustained drainage events (such as those associated with storms and other high volume rain events), during which 40-60% of stormwater can bypass the filtration chamber. In addition, frequent cleaning and/or replacement of filtration media is often required for such filtration chambers, which may not be easily accessible, particularly if they are disposed underground. Moreover, such systems rely on a supply of stormwater to function; as such, they are not directed to water basin remediation or restoration and are instead directed to stormwater filtration. The existing technologies have failed to provide adequate protection of water basins, such that water basin conditions have continually declined while nutrient protection has diminished, resulting in greater and more severe pollution events (such as algae blooms and red tide).

Accordingly, what is needed is a watershed filtration system that reduces contaminants and pollutants that lead to algae bloom events by continuously treating a watershed basin, including between rain events. However, in view of the art considered as a whole at the time the present invention was made, it was not obvious to those of ordinary skill in the field of this invention how the shortcomings of the prior art could be overcome.

BRIEF SUMMARY OF THE INVENTION

The long-standing but heretofore unfulfilled need for a watershed restoration system is now met by a new, useful, and nonobvious invention. An object of the invention is to continuously filter contaminants and pollutants from a water basin, such as a watershed basin, without relying on rain events and without experiencing stormwater bypass during heavy rain events, thereby reducing the frequency and severity of subsequent algae bloom events.

In an embodiment, a water restoration system is presented comprising: at least one influent conduit having a first end opposite a second end, the first end configured to be disposed within a water basin, the second end in fluidic communication with a filtration chamber. The system is also comprised of at least one influent pump fluidically coupled to the at least one influent conduit, with the at least one influent pump being configured to remove an amount of water from the water basin and into the at least one influent conduit. The at least one influent pump may be submersible. The system further comprises a filtration chamber comprised of: a reaction chamber having a top surface opposite a bottom surface and at least one sidewall joining the top surface and the bottom surface, such that the top surface, the bottom surface, and the at least one sidewall together define an interior compartment; and a mixing and aeration chamber having a bottom surface that is disposed below the top surface of the reaction chamber and at least one sidewall joined to the bottom surface of the mixing and aeration chamber to define an interior compartment therein. An amount of a filtration media is disposed within the interior compartment of the reaction chamber. An amount of the filtration media may also be disposed within the interior compartment of the mixing and aeration chamber. In some embodiments, a housing may be present encasing the filtration chamber.

Within and via the water restoration system, the influent conduit is configured to introduce at least a portion of the removed amount of water into the reaction chamber. In some embodiments, the second end of influent conduit terminates in a terminal end that is disposed above the bottom surface of the reaction chamber such that there is a gap between the terminal end of the influent conduit and the bottom surface of the reaction chamber. In some embodiments, terminal end is disposed in a vertical orientation (perpendicularly) to bottom surface of reaction chamber. The reaction chamber is configured to introduce the filtration media to the removed amount of water. A portion of the filtration media and a portion of the removed amount of water are configured to be ejected from the reaction chamber. The filtration chamber is configured to convert the removed amount of water into treated water within the mixing and aeration chamber via aeration from oxygen particles within air surrounding the reaction chamber and via mixing of the filtration media into the amount of water. The treated water is configured to be reintroduced into the water basin to continuously treat untreated water within the water basin. The water restoration system allows for contaminants to be continuously filtered from the water basin without relying on a rain event.

The water restoration system may be further comprised of at least one effluent conduit having a first end opposite a second end, the first end configured to be in fluidic communication with the mixing and aeration chamber of the filtration chamber. The water restoration system may further comprise at least one effluent pump fluidically coupled to the second end of the effluent conduit, the at least one effluent pump configured to reintroduce an amount of the treated water into the water basin. The at least one effluent pump may be submersible.

In some embodiments, the at least one sidewall of the reaction chamber is discontinuous and defines at least one aperture therethrough proximate to the top surface of the reaction chamber. In some embodiments, the top surface of the reaction chamber is a circumferential upper lip such that the reaction chamber defines an open top portion thereof. In other embodiments, the top surface of the reaction chamber is continuous such that the reaction chamber defines a closed top portion thereof. Embodiments in which at least one aperture is present may include either an open top portion or a closed top portion.

In a further embodiment, a method of treating and restoring a water basin by removing an amount of pollutants therefrom is presented, the method comprising the steps of: removing an amount of untreated water from the water basin; ejecting the amount of untreated water into a reaction chamber at a flow velocity; colliding particles of a filtration media into the amount of untreated water within the reaction chamber; ejecting the particles of the filtration media and the amount of untreated water from the reaction chamber at a height; receiving, within a portion of a mixing and aeration chamber that is disposed below the reaction chamber, the particles of the filtration media and the amount of untreated water, such that the particles of the filtration media and the amount of untreated water fall from the height; aerating, via oxygen particles within air surrounding the reaction chamber and at a surface of the mixing and aeration chamber, the amount of untreated water; mixing, within the mixing and aeration chamber, the particles of the filtration media with the aerated amount of untreated water, thereby converting at least a portion of the amount of untreated water into treated water; and reintroducing the treated water into the water basin. In some embodiments, the water restoration system, as described previously, is used to treat the water of the water basin and reintroduce treated water into the water basin.

In some embodiments, the reaction chamber and the mixing and aeration chamber are components of a filtration chamber as described previously.

In some embodiments, the amount of untreated water is removed from the water basin via at least one influent pump fluidically coupled to at least one influent conduit configured to eject the amount of untreated water into the reaction chamber at a flow velocity to collide the particles of the filtration media into the amount of untreated water. The at least one influent pump may be submersible to push the untreated water through the at least one influent conduit.

The treated water may be reintroduced into the water basin via at least one effluent conduit in fluidic communication with the mixing and aeration chamber. In some embodiments, the treated water is pulled into the water basin via at least one effluent pump fluidically coupled to the at least one effluent conduit. The effluent pump may be submersible.

A method of reducing contaminants in a water basin is presented comprising: removing an amount of untreated water containing contaminants from the water basin via at least one influent pump fluidically coupled to at least one influent conduit; ejecting the amount of untreated water from the at least one influent conduit into a reaction chamber at a flow velocity wherein the reaction chamber contains an amount of filtration media; colliding the particles of the filtration media with the amount of untreated water in the reaction chamber; ejecting the particles of the filtration media and the amount of untreated water from the reaction chamber at a height into a mixing and aeration chamber disposed below the reaction chamber; aerating, via oxygen particles within air surrounding the reaction chamber and at a surface of the mixing and aeration chamber, the amount of untreated water; mixing, within the mixing and aeration chamber, the particles of the filtration media with the aerated amount of untreated water, thereby removing the contaminants and converting at least a portion of the amount of untreated water into treated water; and reintroducing the treated water into the water basin.

The at least one influent pump may be submersible to push the untreated water through the at least one influent conduit.

The treated water may be reintroduced into the water basin via at least one effluent conduit in fluidic communication with the mixing and aeration chamber. In some embodiments, the treated water is pulled into the water basin via at least one effluent pump fluidically coupled to the at least one effluent conduit. The effluent pump may be submersible.

In some embodiments, the water restoration system, as described previously, is used to treat the water of the water basin and reintroduce treated water into the water basin. In some embodiments, the reaction chamber and the mixing and aeration chamber are components of a filtration chamber as described previously.

In a further embodiment, a method of reducing formation of undesirable algae bloom events in a water basin is presented comprising: removing an amount of untreated water containing contaminants from the water basin via at least one influent pump fluidically coupled to at least one influent conduit; ejecting the amount of untreated water from the at least one influent conduit into a reaction chamber at a flow velocity wherein the reaction chamber contains an amount of filtration media; colliding the particles of the filtration media with the amount of untreated water in the reaction chamber; ejecting the particles of the filtration media and the amount of untreated water from the reaction chamber at a height into a mixing and aeration chamber disposed below the reaction chamber; aerating, via oxygen particles within air surrounding the reaction chamber and at a surface of the mixing and aeration chamber, the amount of untreated water; mixing, within the mixing and aeration chamber, the particles of the filtration media with the aerated amount of untreated water, thereby removing the contaminants and converting at least a portion of the amount of untreated water into treated water; and reintroducing the treated water into the water basin wherein removal of contaminants in the water basin reduces the formation of undesirable algae bloom events in the water basin. The at least one influent pump may be submersible to push the untreated water through the at least one influent conduit.

The treated water may be reintroduced into the water basin via at least one effluent conduit in fluidic communication with the mixing and aeration chamber. In some embodiments, the treated water is pulled into the water basin via at least one effluent pump fluidically coupled to the at least one effluent conduit. The effluent pump may be submersible.

In some embodiments, the water restoration system, as described previously, is used to treat the water of the water basin and reintroduce treated water into the water basin. In some embodiments, the reaction chamber and the mixing and aeration chamber are components of a filtration chamber as described previously.

These and other important objects, advantages, and features of the invention will become clear as this disclosure proceeds. The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 1A-B depicts a A) schematic overview of a water restoration system, and B) a top view of the schematic of the system, in accordance with an embodiment of the present invention.

FIG. 6 depicts a table showing treatment capacities of different water basins using a water restoration system, in accordance with an embodiment of the present invention.

DETAILED DESCRIPTION OF THE INVENTION

Figure 2A:
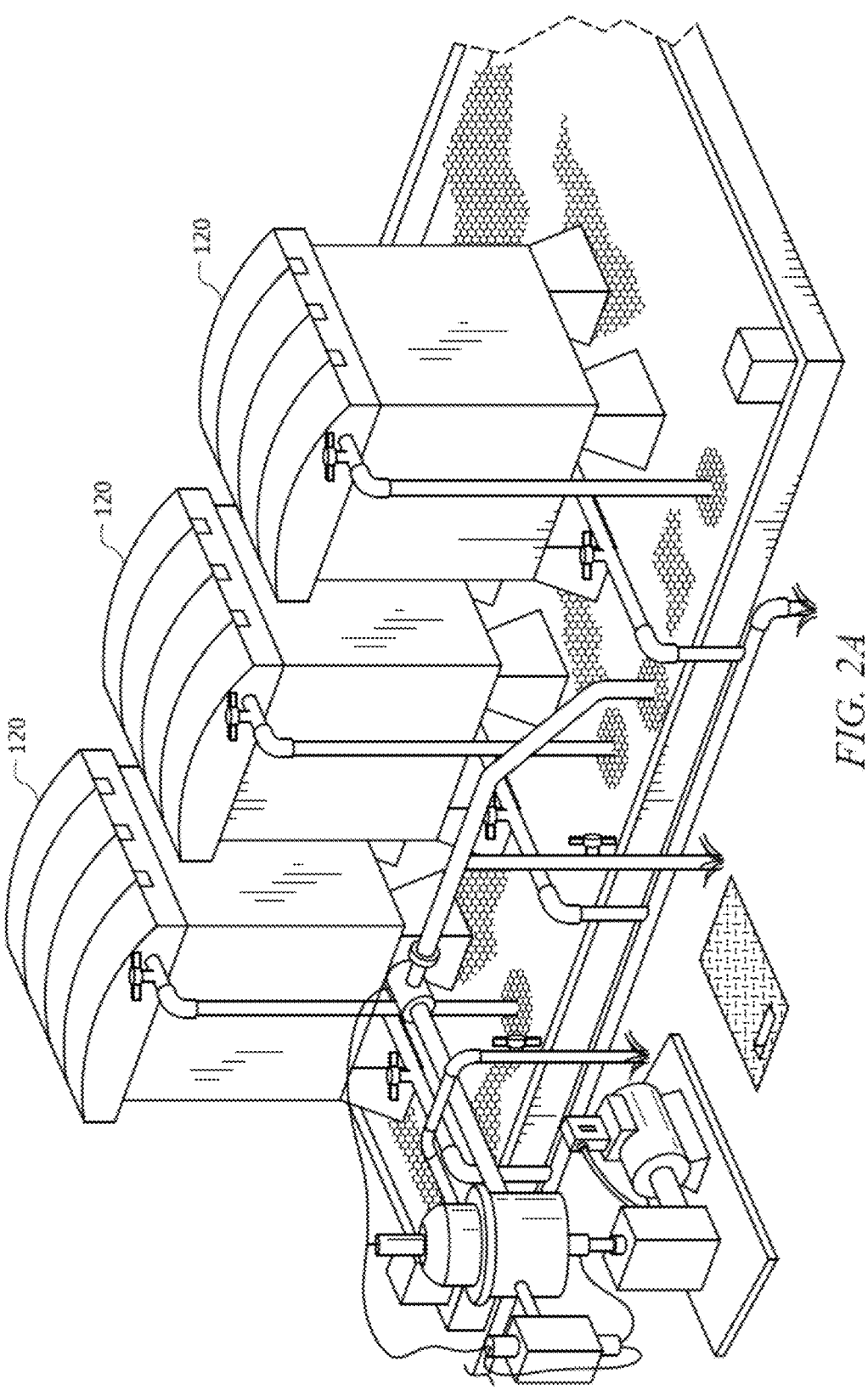
FIG. 2A is a perspective view of a water restoration system, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.
Definitions Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supersedes any disclosure of an incorporated publication to the extent there is a contradiction.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The term "about" or "approximately" as used herein refers to being within an acceptable error range for the particular value as determined by one of ordinary skill in the art, which will depend in part on how the value is measured or determined. As used herein, "about" or "approximately" refers to within 10% of the numerical value. It should be understood that a numerical including an associated range with a lower boundary of greater than zero must be a non-zero numerical, and the term "about" should be understood to include only non-zero values in such scenarios.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. Where a range of values is provided, it is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed in the invention. The upper and lower limits of these smaller ranges may independently be excluded or included within the range. Each range where either, neither, or both limits are included in the smaller ranges are also encompassed by the invention, subject to any specifically excluded limit in the stated range. Where the stated range includes one or both of the limits, ranges excluding either or both of those excluded limits are also included in the invention.

As used herein, the term "comprising" is intended to mean that the products, systems, and methods include the referenced components or steps, but not excluding others. "Consisting essentially of" when used to define products, systems, and methods, shall mean excluding other components or steps of any essential significance. "Consisting of" shall mean excluding more than trace elements of other components or steps.

"Water basin" as used herein refers to a natural or artificial collection of water, in some cases a collection of surface water. Examples of a water basin include, but are not limited to, watersheds, wetlands, stormwater retention/detention basins, streams, lakes, rivers, coastal waters, ponds, estuaries, tributaries, reservoirs, lagoons, and any other saltwater sources, brackish water sources, or freshwater sources.

"Filtration media" as used herein refers to materials used to separate unwanted particles, impurities, or contaminants from a fluid such as water. In some embodiments, the filtration media used herein may include, but is not limited to, sand; clay; iron humate; compost; peat; carbon including granular activated carbon; anthracite; zeolite; garnet; perlite; activated aluminum; magnetite; pollutant specific media; proprietary filter media; and combinations thereof. In some embodiments, the filtration media is also comprised of microbes. In some embodiments, a base filtration media is used which is comprised of sand, clay, or iron humate alone or a mixture of sand and either clay or iron humate. Other filtration media and combinations thereof are then added to this base filtration media along with microbes.

"Flotation device" as used herein refers to any structure capable of supporting the water restoration system described herein on the surface or above the surface of the water in the water basin.

"Pollutant specific media" as used herein refers to media which is effective at removing one or more specific contaminants/pollutants, such as heavy metals or organic pollutants, in a fluid such as water.

"Flow velocity" as used herein refers to the velocity of water (i.e., the distance of the water within a unit or time or how fast the water is moving) multiplied by the radius of the pipe/conduit squared. The smaller the radius of the pipe/conduit, the greater the velocity at the same flow rate.

"Conduit" as used herein refers to a passageway through which a fluid is conveyed such as a channel, pipe, tube, trough, etc. The conduit may be enclosed, as in a tube or pipe, or have a concave shape with an open top, such as in a channel or trough. In some embodiments, influent and effluent conduits refer to enclosed passages such as pipes or tubes.

"Channel" or "trough" as used herein refers to a concave shape with an open top that is used as a passageway through which a fluid such as water is conveyed.

"Treat" as used herein refers to the removal of at least a portion of undesirable contaminants, pollutants, chemicals, metals, harmful bacteria, or other undesirable materials from water obtained from a water basin.

"Contaminants" as used herein refers to any undesirable physical, chemical, biological, or radiological substance found in a water basin. Examples of contaminants include, but are not limited to, harmful microorganisms including, but not limited to, bacteria such as *Escherichia coli* and Giardia, viruses such as noroviruses, parasites, dinoflagellates, diatoms, and cyanobacteria; inorganic and organic chemicals including, but not limited to, lead, arsenic, nitrates, nitrites, copper, arsenic, lead, fluoride, uranium, per- and polyfluoroalkyl substances (PFAS), tri- and tetrachloroethylene, chloroform, barium, cadmium, aluminum, chromium, manganese, aluminum, hydrogen sulfide; excess nutrients such as excess phosphorous (phosphates) and excess nitrogen (nitrates); oils and grease. The removal of specific contaminants by the water restoration system described herein is dependent on the composition of the filtration media used. "Contaminants" and "pollutants" are used interchangeably herein.

The present invention describes a water restoration system including a filtration chamber disposed proximate to or within a water basin, such as a watershed basin, to continuously filter contaminants from the water basin without relying on a rain event. The filtration chamber includes a reaction chamber and an aeration and mixing chamber, such that the water from the basin interacts with filtration media within the reaction chamber, and such that the filtration media mixes with the water (while the water is aerated) within the aeration and mixing chamber. As a result, water from the basin is continuously filtered through the water restoration system to reduce the concentration of contaminants, such as phosphorus and nitrogen, from the water basin. While the water restoration system is described in the various embodiments as being used in relation to a water basin, such use is illustrative and is not intended to limit the disclosure in any way. It should be noted that the water restoration system described herein may also be used to treat any high nutrient loadings or contamination in any contained body of water, including water storage chambers or water tanks, such as those used in wastewater treatment effluent storage tanks. The water restoration system is described in greater detail in the sections below.

As shown in FIGS. 1-5, the water restoration system is generally comprised of filtration chamber 100, which includes reaction chamber 102 and mixing and aeration chamber 104; influent pump 114; influent conduit 110; and effluent conduit 116. As shown in the embodiment of FIG. 1A-B, in an embodiment of filtration chamber 100, reaction chamber 102 is separate from mixing and aeration chamber 104; however, it should be appreciated that in other embodiments of filtration chamber 100, reaction chamber 102 and mixing and aeration chamber 104 may be combined or may be separated by a thin membrane. As shown in particular in FIG. 2A-C, an embodiment of the water restoration system may also comprise housing 120 which forms an outer container encasing/surrounding filtration chamber 100.

An embodiment of reaction chamber 102 includes top surface 108 opposite bottom surface 106, with one or more sidewalls joining top surface 108 to bottom surface 106, such that top surface 108, bottom surface 106, and the one or more sidewalls together define an interior compartment. Top surface 108 may be parallel to bottom surface 106, such that top surface 108 and bottom surface 106 together with the one or more sidewalls define an enclosed space within the interior compartment and a closed top portion thereof. In other embodiments, top surface 108, bottom surface 106, and the one or more sidewalls define a partially enclosed space such that reaction chamber 102 defines a partially open top portion thereof. In other embodiments, top surface 108 forms a circumferential upper lip of reaction chamber 102, such that reaction chamber 102 defines an open top portion thereof. In some embodiments, at least one of the one or more sidewalls of reaction chamber 102 is discontinuous, such that one or more apertures 122 (shown in more detail in FIGS. 3-4) are defined by reaction chamber 102. In other embodiments, the sidewalls of reaction chamber 102 are continuous. In an embodiment, top surface 108 is spaced apart from bottom surface 106 by approximately 36 inches, thereby defining a height of reaction chamber 102, which maintains a minimal visibility and minimal wind exposure of reaction chamber 102 and of filtration chamber 100. It is important to note that while approximately 36 inches is used as an example, the height of reaction chamber 102 may vary according to the size of reaction chamber 102 and other heights are contemplated herein.

Figure 3:
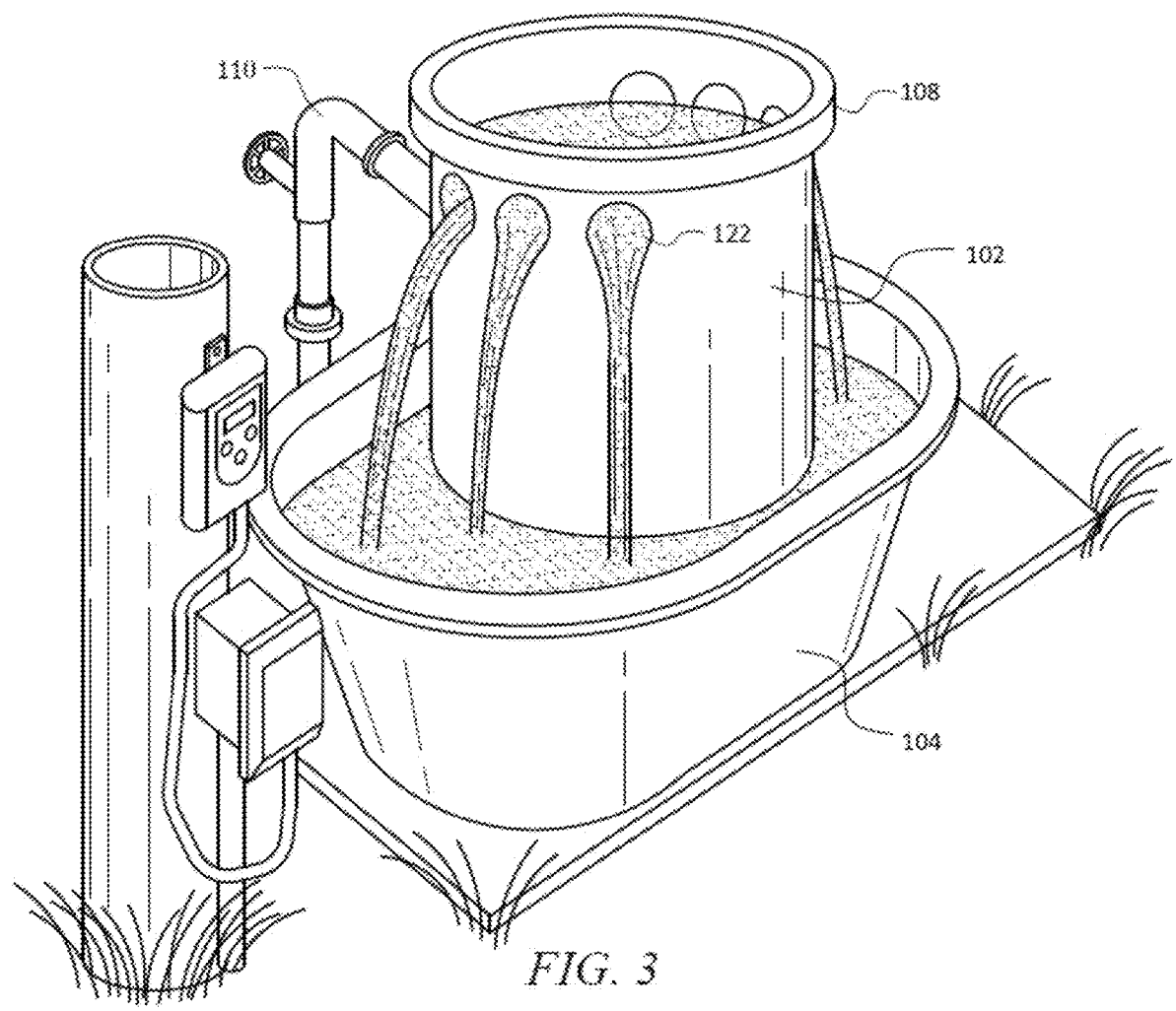
FIG. 3 is a side perspective view of a reaction chamber of a water restoration system, in accordance with an embodiment of the present invention.
Figure 4:
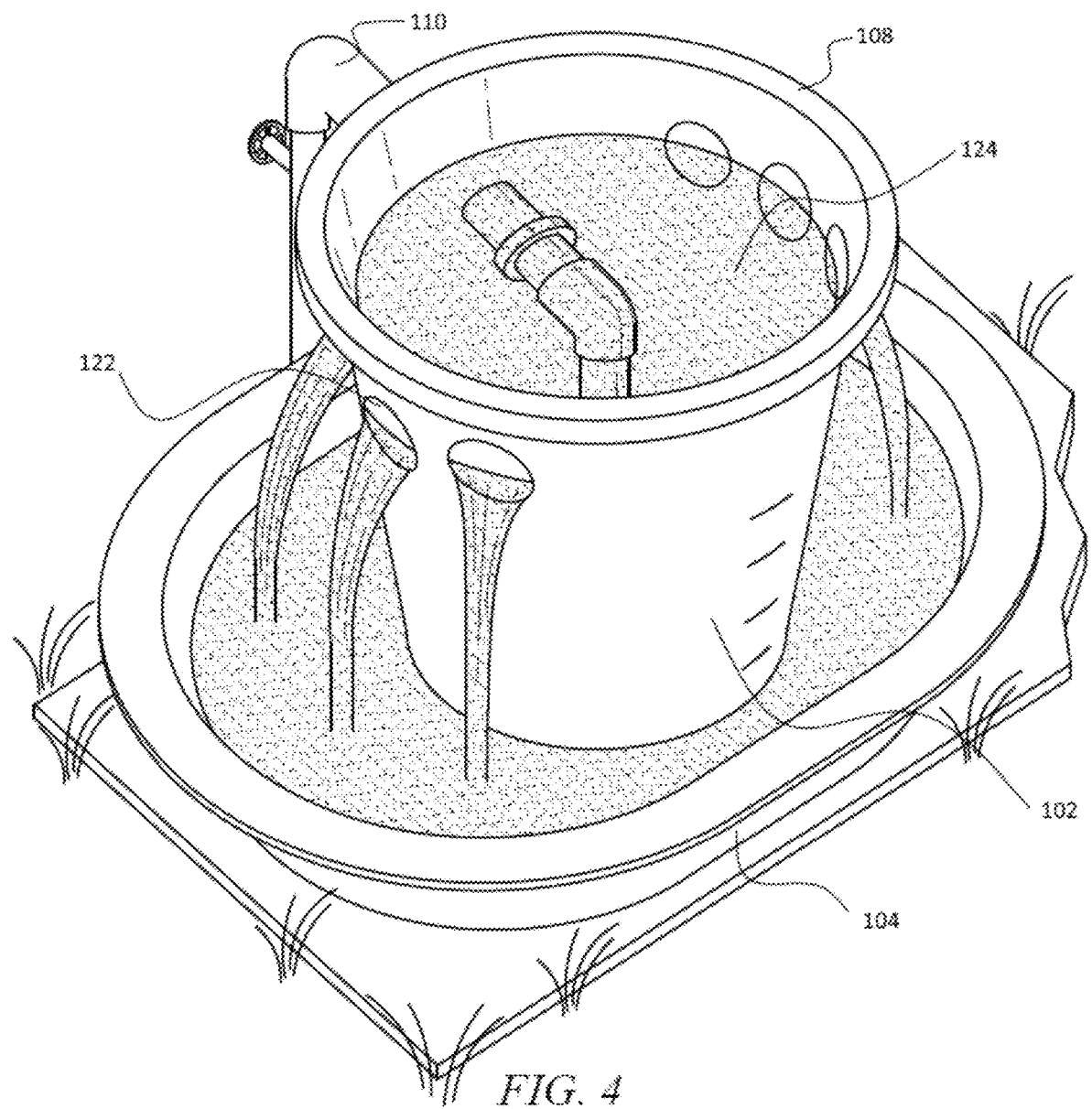
FIG. 4 is a top perspective view of the reaction chamber of FIG. 3, in accordance with an embodiment of the present invention.

In an embodiment, mixing and aeration chamber 104 is disposed beneath reaction chamber 102. For example, in an embodiment, reaction chamber 102 resides within an internal compartment defined by interior lateral surfaces of mixing and aeration chamber 104, such that top surface 108 of reaction chamber 102 is disposed above a bottom surface of mixing and aeration chamber 104. In another embodiment, mixing and aeration chamber 104 is disposed proximate to reaction chamber 102, such that a bottom surface of mixing and aeration chamber 104 is disposed below top surface 108 of reaction chamber 102. In embodiments in which sidewalls of reaction chamber 102 are discontinuous, the one or more apertures 122 defined by reaction chamber 102 are disposed above the bottom surface of mixing and aeration chamber 104 and below top surface 108 of reaction chamber 102, such that fluid disposed within reaction chamber 102 can enter mixing and aeration chamber 104 via the one or more apertures 122 (as shown in FIGS. 3-4 and discussed in greater detail herein below).

To receive fluid for filtration within filtration chamber 100, the water restoration system includes influent conduit 110 that is fluidically coupled to reaction chamber 102. Specifically, influent conduit 110 includes a first end that is in fluidic communication with a water basin including an amount of water therein, and influent conduit 110 includes an opposing second end that is in fluidic communication with reaction chamber 102. To facilitate the removal of water from the water basin, in an embodiment, influent conduit 110 is fluidically coupled to influent pump 114, which removes an amount of water from the water basin and inputs the removed water into influent conduit 110. In an embodiment such as that shown in FIGS. 2A-C and 3, influent pump 114 and influent conduit 110 are installed within approximately 20 feet of an edge of the water basin, however other distances are contemplated, including those distances both closer and farther from the water basin. If farther from the water basin, additional lengths of influent/effluent conduit and/or pumps may be utilized. Use of a land-based influent pump allows for an amount of water from the water basin to be pulled into influent conduit 110. In other embodiments such as that shown in FIG. 1, influent pump 114 is a submersible pump that is located in the water basin and acts to push an amount of water from the water basin into influent conduit 110.

In some embodiments, a plurality of influent conduits 110 are used within the system, with each of the plurality of influent conduits 110, each being comprised of first and second ends with first end of each influent conduit 110 being in fluidic communication with water basin and second end of each influent conduit 110 being fluidically connected to reaction chamber 102. A separate influent pump 114 having an inlet and an outlet may be fluidically coupled to each of the influent conduits 110. Alternatively, one larger influent pump 114 having a plurality of inlets may be used such that each of the influent conduits 110 is fluidically connected to a separate inlet of the larger influent pump.

In an embodiment, the second end of influent conduit 110 includes terminal end 112 that is disposed within reaction chamber 102. For example, in an embodiment, terminal end 112 is disposed above bottom surface 106 of reaction chamber 102, such that the amount of water within influent conduit 110 exits influent conduit 110 via terminal end 112 and enters reaction chamber 102. As such, a gap exists between terminal end 112 and bottom surface 106 of reaction chamber 102, such that the amount of water contacts bottom surface 106 at a flow velocity. In an embodiment, the gap between terminal end 112 and bottom surface 106 of reaction chamber 102 is approximately 3 inches; however, it should be appreciated that other gap sizes are contemplated herein. Gap sizes may change in accordance with the size of the filtration chamber/reaction chamber. In some embodiments, terminal end 112 of influent conduit 110 may be fluidically coupled to a nozzle to concentrate the water flow to bottom surface 106 of reaction chamber 102. In some embodiments, nozzle may have an adjustable diameter.

Figure 5:
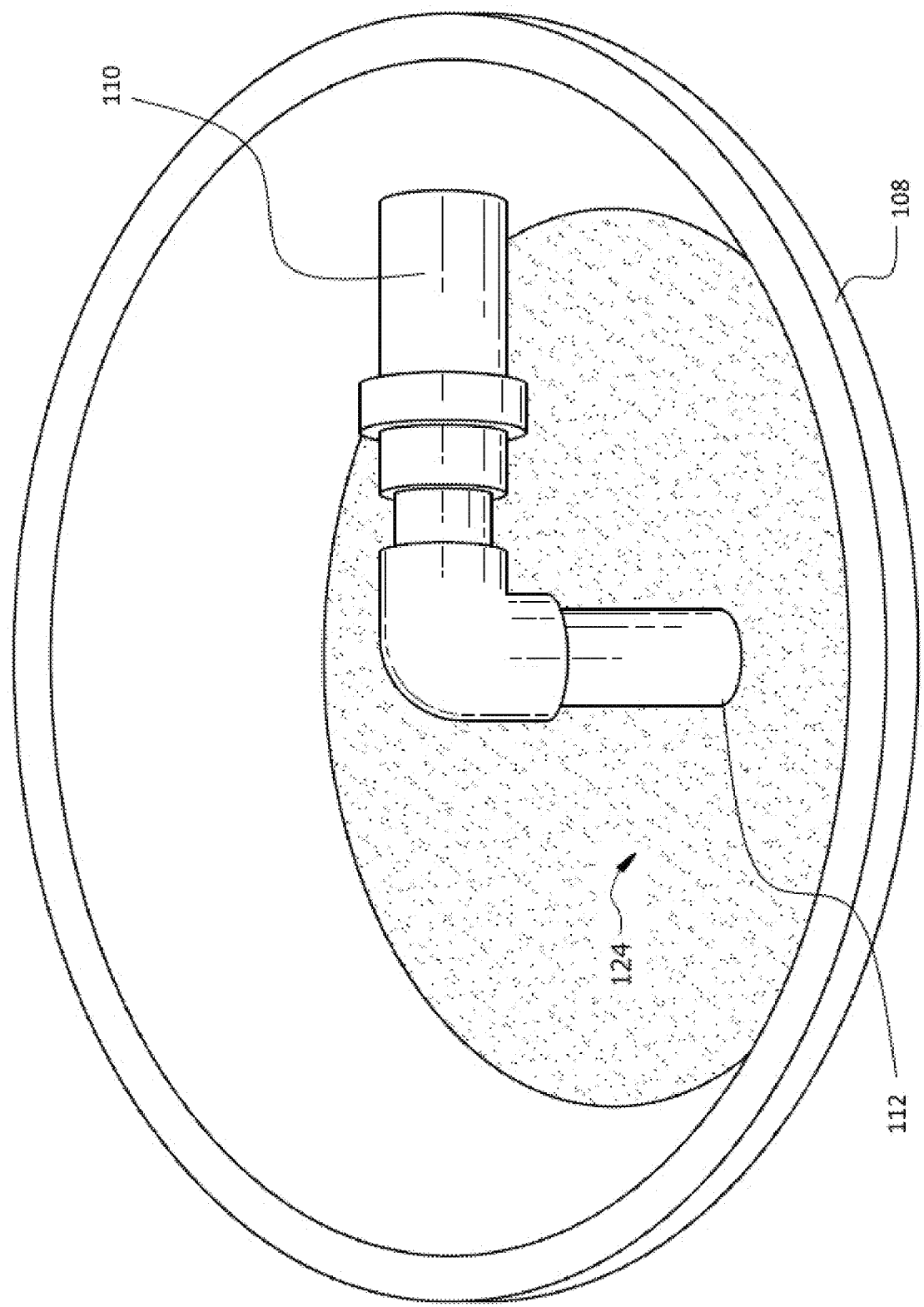
FIG. 5 is a top plan internal view of the reaction chamber of FIGS. 3-4, in accordance with an embodiment of the present invention.

In addition, as shown in particular in FIG. 5, the amount of water, upon entering reaction chamber 102, contacts filtration media 124 which may include microbes. In an embodiment, filtration media 124 includes an approximately equal amount (e.g., a 50%/50% split) of sand and clay. In another embodiment, filtration media 124 includes an approximately equal (e.g., a 50%/50% split) of sand and iron humate. Such percentages are exemplary and other percentages are contemplated including ranges of sand and clay or sand and iron humate from 0 to 100% (e.g., 0% sand and 100% clay or 100% iron humate or alternatively, 0% clay or iron humate and 100% sand), including all intervening percentages and ratios. In some embodiments, the sand, clay, iron humate, or combinations thereof comprise a base filtration media to which other filtration media may be added. For example, in other embodiments, compost; peat; carbon including granular activated carbon; anthracite; zeolite; garnet; perlite; activated aluminum; magnetite; pollutant specific media; proprietary filter media; and combinations thereof can be added to the base filtration media to form the filtration media. Examples of sand that may be used include, but are not limited to, silica sand and quartz sand. Moreover, microbes may also be added to filtration media 124 via liquid gallon containers or via powder that is mixed with filtration media 124, such that the microbes are subsequently introduced to the water basin. Due to the flow velocity experienced by the amount of water, heavy turbulence and mixing of filtration media 124 with the amount of water is created within reaction chamber 102 via the vertical stream of the amount of water contacting bottom surface 106 of reaction chamber 102. Thereafter, the components of filtration media 124 within reaction chamber 102 collide with each other to break up the pollutants and filtration media particles within the amount of water, creating fine microscopic and nanosized particles within reaction chamber 102.

As noted above, in some embodiments, one or more sidewalls of reaction chamber 102 are discontinuous such as that reaction chamber 102 defines one or more apertures 122 therein. In an embodiment (as shown in FIGS. 3-4 in particular), six apertures 122 are defined by reaction chamber 102, with apertures 122 measuring approximately 2.5 inches in diameter, with a flow rate of fluid through apertures 122 of approximately 100 gallons per minute. It is important to note that the presence of six apertures 122 is exemplary and other numbers of apertures are contemplated for use herein, including all 0 and all positive integers. It is also important to note that the number and diameter of apertures 122 influences the flow rate of fluid and thus each can be adjusted to accommodate the desired flow rate. As the amount of water enters reaction chamber 102 and contacts filtration media 124, the flow velocity of the amount of water forces the amount of water toward top surface 108 of reaction chamber 102. Due to the one or more apertures 122 defined by reaction chamber 102, the amount of water exits reaction chamber 102 through one or more apertures 122 and falls in a direction toward mixing and aeration chamber 104, such that the amount of water mixes with filtration media 124 while being aerated due to the addition of oxygen from the falling water contacting oxygen in external air. The combination of filtration media 124 and oxygen from the surrounding air thereby treats the amount of water within mixing and aeration chamber 104. The one or more apertures 122 may be present in embodiments including a closed top portion, an open top portion, or a partially open top portion of reaction chamber 102.

Moreover, in an embodiment, filtration chamber 100 includes an energy capture unit (such as a water wheel)

disposed below the one or more apertures 122, such that the falling water impacts or drives the energy capture unit to recovery an amount of energy, which can be used to at least partially replenish energy expended by the system during operation.

In an alternative embodiment, a reaction chamber effluent conduit may be fluidically coupled to each aperture 122 and extend from aperture 122 in reaction chamber 102 into mixing and aeration chamber 104 to further guide the amount of water exiting reaction chamber 102 into mixing and aeration chamber 104. In some embodiments, such reaction chamber effluent conduit may be discontinuous in its circumference such that the reaction chamber effluent conduit forms an open-top channel or trough (as opposed to a closed tube or pipe) so that the water may contact oxygen in the air for aeration. In embodiments in which at least one reaction chamber effluent conduit is used, the reaction chamber effluent conduit is comprised of a first end fluidically coupled to the aperture and a second end of reaction chamber effluent conduit terminating in a terminal end which is disposed above bottom surface of mixing and aeration chamber, such that the amount of water in reaction chamber effluent conduit exits reaction chamber effluent conduit and enters mixing and aeration chamber. In some embodiments, there is a gap between terminal end of reaction chamber effluent conduit and bottom surface of mixing and aeration chamber such that the amount of water contacts bottom surface at a flow velocity to further mix filtration media with the amount of water.

As described previously in some embodiments, top surface 108 forms a circumferential upper lip of reaction chamber 102, such that reaction chamber 102 defines an open top portion thereof. In this embodiment, as the amount of water enters reaction chamber 102 and contacts filtration media 124, the flow velocity of the amount of water forces the amount of water over top surface 108 of reaction chamber 102 such that the water exits reaction chamber 102 and falls in a direction toward mixing and aeration chamber 104, such that the amount of water mixes with filtration media 124 while being aerated due to the addition of oxygen from the falling water contacting oxygen in external air. The combination of filtration media 124 and oxygen from the surrounding air thereby treats the amount of water within mixing and aeration chamber 104. A similar mechanism of action is present in embodiments in which top surface 108 forms a partially open portion of reaction chamber 102.

After mixing with filtration media 124 within reaction chamber 102 and mixing and aeration chamber 104, the treated amount of water is reintroduced into the water basin, such that filtration media 124 is dispersed into the water basin. The treated amount of water introduces filtration media 124, including microbes, into the water basin to bind untreated nutrients and pollutants within the water basin, ultimately settling on a bottom surface of the water basin to continuously react with additional untreated nutrients and pollutants.

In an embodiment, the water restoration system includes effluent conduit 116 having a first end that is in fluidic communication with mixing and aeration chamber 104 and an opposing second end that is in fluidic communication with the water basin. In this embodiment, after mixing with filtration media 124, the treated amount of water exits mixing and aeration chamber 104 and enters the water basin via effluent conduit 116. The length of effluent conduit 116 is dependent on the proximity of filtration chamber 100, and specifically mixing and aeration chamber 104, from the water basin.

In an alternative embodiment, the water restoration system includes effluent pump 118 that is fluidically coupled to effluent conduit 116 to facilitate the reentry of the treated amount of water into the water basin. Effluent pump 118 may be coupled to the second end of effluent conduit 116 to facilitate movement of the filtration media 124 treated fluid from filtration chamber 100 to the water basin. Effluent pump 118 may be submersible or located proximate to the edge of water basin. Effluent pump 118 includes inlet and outlet conduits such that the second end of effluent conduit 116 is fluidically connected to inlet of effluent pump 118 and outlet of effluent pump 118 is disposed in (for submersible effluent pumps) or proximate to (for land based effluent pumps) water basin to allow treated water to be deposited into water basin.

In some embodiments, a plurality of effluent conduits 116 are used within the system, with each of the plurality of effluent conduits 116 being secured to filtration chamber 100 at a first end and in fluidic communication with the water basin at the second end. In embodiments which use effluent pump 118, a separate effluent pump 118 may be fluidically coupled to the second end of each of the effluent conduits 116. Alternatively, one larger effluent pump 118 having a plurality of inlets may be used such that the second end of each of the effluent conduits 116 is fluidically connected to a separate inlet of the larger effluent pump. The outlet of effluent pump 118 is disposed within or proximate to edge of water basin to allow treated water to be deposited into water basin.

It should be appreciated that in other embodiments, the treated amount of water reenters the water basin directly from mixing and aeration chamber 104 and without requiring effluent conduit 116 or effluent pump 118, such as in an embodiment in which filtration chamber 100 is disposed in a flotation device disposed on or above a surface of the water basin. In this embodiment, mixing and aeration chamber 104 may have a selectively closable/openable barrier on its sidewall or bottom surface such that when the barrier is open, treated water from mixing and aeration chamber 104 enter water basin directly while when the barrier is closed, mixing and aeration may occur in mixing and aeration chamber 104.

Upon entry into the water basin, the water treated with filtration media 124 reacts with the untreated (or partially treated) water disposed within the water basin. Specifically, the active filtration media 124 reacts with the water within the basin to remove contaminants therefrom, with the clay and/or iron humate particles of filtration media 124 adsorbing phosphorus and nitrogen disposed within the water basin as filtration media 124 translates within the water basin and settles on a bottom surface thereof. Moreover, the microbes of filtration media 124 react with phosphorus and nitrogen particles disposed within the water basin as filtration media 124 is introduced into the water basin. Specifically, the microbes provide a combined process of cellular uptake and oxidation reduction of waste organic matter within the body of water, with a corresponding continued anoxic respiration process occurring within an anaerobic zone of the water basin. The microbes utilize oxidized nitrogen compounds as electron acceptors, such the that microbes denitrify the water basin by converting nitrate to nitrogen gas, thereby removing nitrate from the water basin.

Figure 2B:
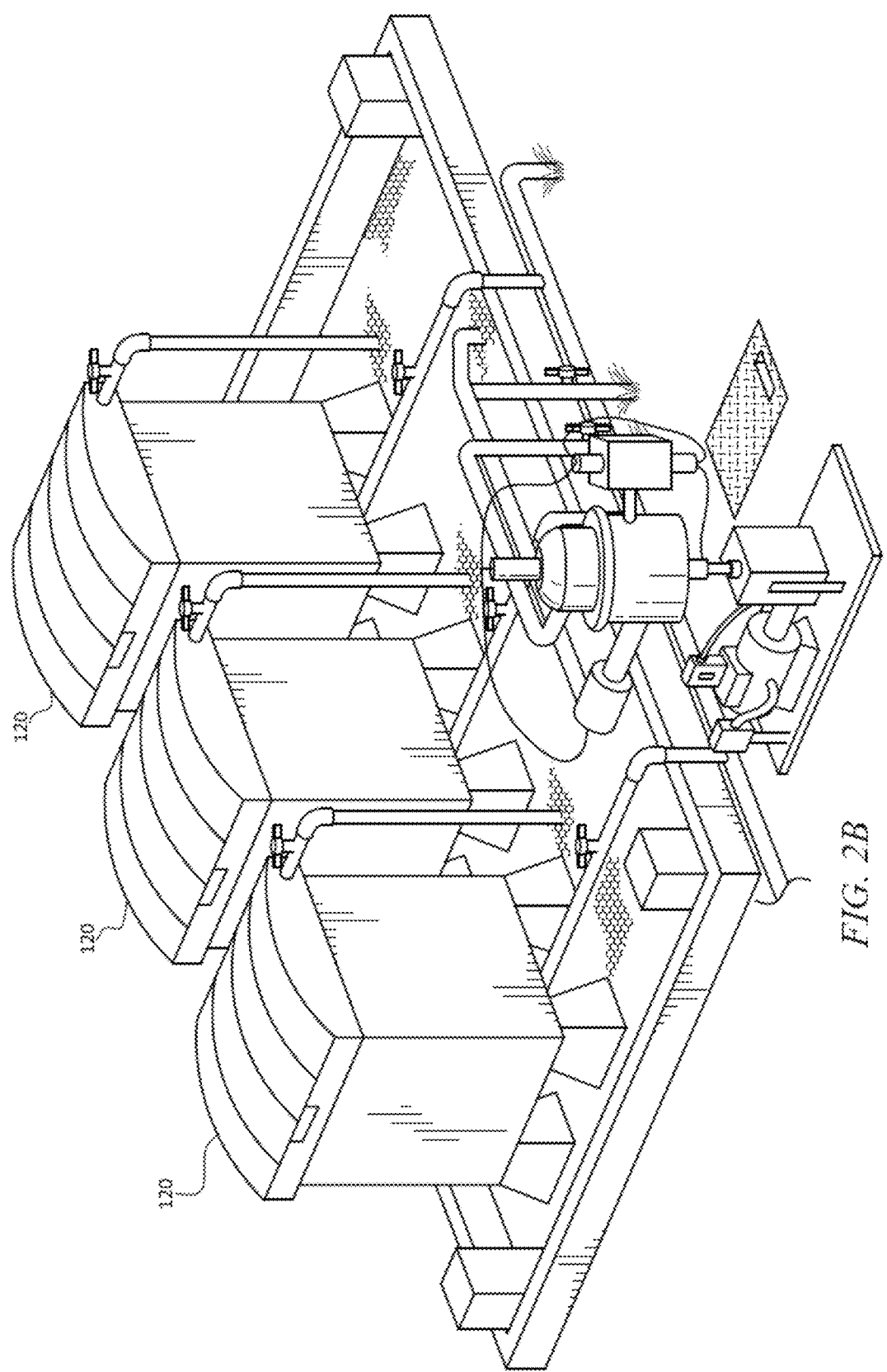
FIG. 2B is a perspective view of a water restoration system, in accordance with an embodiment of the present invention.
Figure 2C:
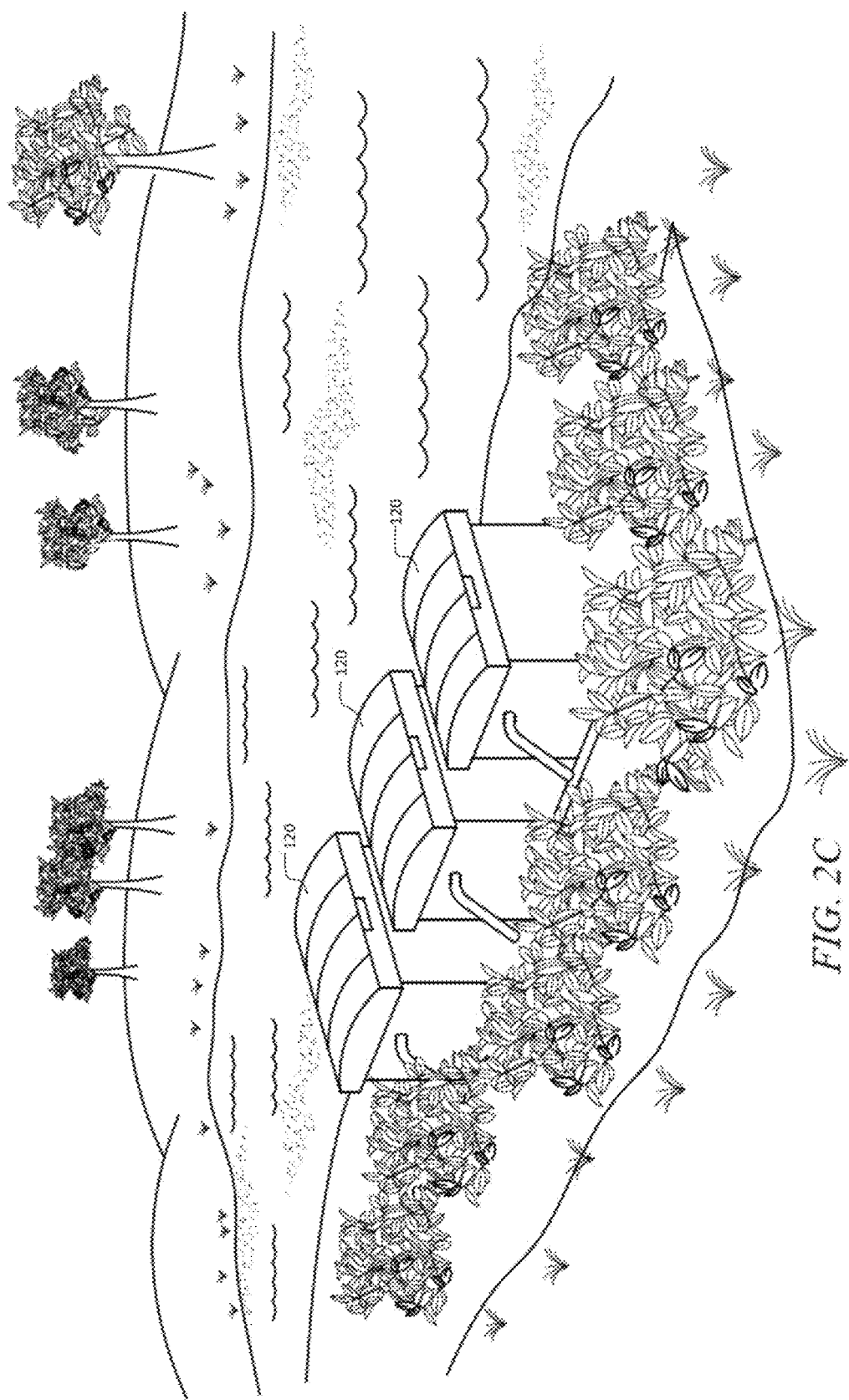
FIG. 2C is a perspective view of a water restoration system installed proximate to a water basin, in accordance with an embodiment of the present invention.

In an embodiment, the water restoration system includes a single filtration chamber 100, as shown in FIG. 1A-B; however, it should be appreciated that other embodiments of the water restoration system include a plurality of filtration chambers 100, such as the embodiment of water restoration system shown in FIG. 2A-C. Accordingly, the water restoration system is scalable to include one or more filtration chambers 100 to treat water and introduce filtration media 124 into a water basin. Examples of different water restoration systems used in combination with basins of different sizes and volumes are shown in the table depicted in FIG. 6, as well as in Tables 1 and 2 below.

TABLE 1

Total phosphorus (TP) and total nitrogen (TN) removal using different water restoration systems

|  | Single Chamber Single Basin | Multiple Chamber Multiple Basin |
|---|---|---|
| Amount of water treated annually (gallons) | 84,096,000 | 1,177,344,000 |
| TP concentration (mg/L)-existing conditions | 0.700 | 0.700 |
| Annual TP load (lbs./year) | 489 | 6,840 |
| TP reduction (%) | 70 | 70 |
| Annual TP removal (lbs.) | 342 | 4,788 |
| TN concentration (mg/L)-existing conditions | 0.90 | 0.90 |
| Annual TN load (lbs./year) | 628 | 8,795 |
| TN reduction (%) | 50 | 50 |
| Annual TN removal (lbs.) | 314 | 4,397 |

TABLE 2

Water treatment in gallons for different water restoration systems

| Chambers | GPM | Total GPM | Gal/hour | Gal/day | Gal/month | Gal/year |
|---|---|---|---|---|---|---|
| 1 | 160 | 160 | 9,600 | 230,400 | 7,008,000 | 84,096,000 |
| 2 | 160 | 320 | 19,200 | 460,800 | 14,016,000 | 168,192,000 |
| 3 | 160 | 480 | 28,800 | 691,200 | 21,024,000 | 252,288,000 |
| 4 | 160 | 640 | 38,400 | 921,600 | 28,032,000 | 336,384,000 |
| 5 | 160 | 800 | 48,000 | 1,152,000 | 35,040,000 | 420,480,000 |
| 6 | 160 | 960 | 57,600 | 1,382,400 | 42,048,000 | 504,576,000 |
| 7 | 160 | 1,120 | 67,200 | 1,612,800 | 49,056,000 | 588,672,000 |
| 8 | 160 | 1,280 | 76,800 | 1,843,200 | 56,064,000 | 672,768,000 |
| 9 | 160 | 1,440 | 86,400 | 2,073,600 | 63,072,000 | 756,864,000 |
| 10 | 160 | 1,600 | 96,000 | 2,304,000 | 70,080,000 | 840,960,000 |
| 11 | 160 | 1,760 | 105,600 | 2,534,400 | 77,088,000 | 925,056,000 |
| 12 | 160 | 1,920 | 115,200 | 2,764,800 | 84,096,000 | 1,009,150,000 |
| 13 | 160 | 2,080 | 124,800 | 2,995,200 | 91,104,000 | 1,093,240,000 |
| 14 | 160 | 2,240 | 134,400 | 3,225,600 | 98,112,000 | 1,117,344,000 |

Figure 7:
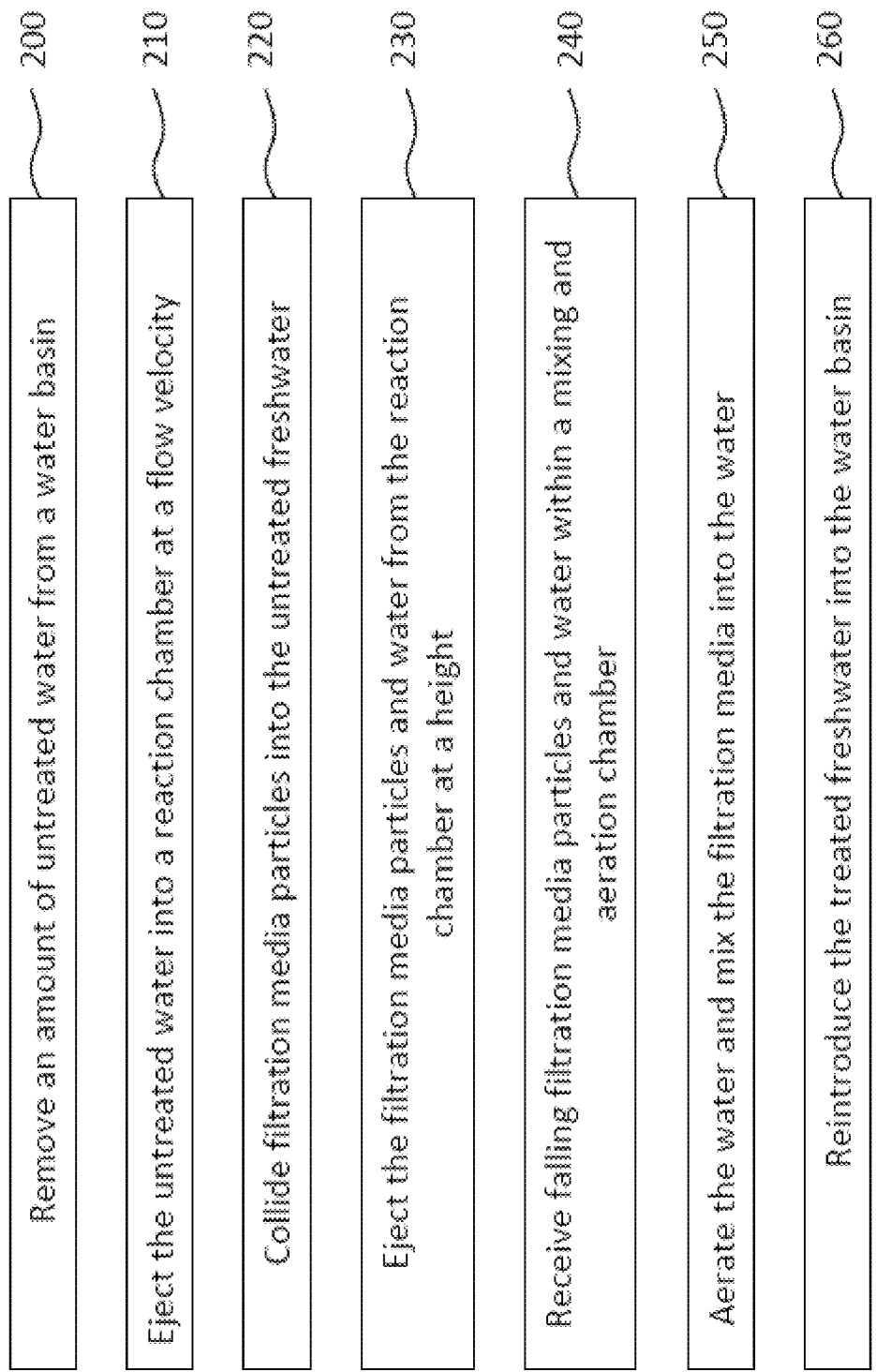
FIG. 7 depicts a process flow diagram showing a method of treating and restoring a water basin, in accordance with an embodiment of the present invention.

Referring now to FIG. 7, an exemplary process-flow diagram is provided, depicting a system and method of treating and restoring a water basin by removing contaminants therefrom. The steps delineated in the exemplary process-flow diagram of FIG. 7 are merely exemplary of an order of treating and restoring a water basin. The steps may be carried out in another order, with or without additional steps included therein.

As shown in FIG. 7, the method of treating and restoring a water basin includes step 200 of removing an amount of untreated water from a water basin, such as via influent conduit 110. During step 210, the untreated water is ejected into reaction chamber 102 at a flow velocity to create turbulence within reaction chamber 102, thereby allowing filtration media 124 particles in reaction chamber 102 to collide into the untreated water during step 220. Subsequent to the interaction between filtration media 124 and the untreated water, during step 230, filtration media 124 particles and the water within reaction chamber 102 are ejected from reaction chamber 102 at a height. As such, during step 240, filtration media 124 particles and the water fall from the height and are received within mixing and aeration chamber 104; consequently, during step 250, the water is aerated due to interactions with air while falling toward mixing and aeration chamber 104, and additional filtration media 124 located in mixing and aeration chamber 104 is mixed into the water, thereby treating the water. During step 260, the treated water is reintroduced into the water basin, such as via effluent conduit 116, to continuously treat and restore the water basin thereafter by removing pollutants, contaminants, and excess nutrients therefrom (such as phosphorus and nitrogen). This removal of pollutants, contaminants, and excess nutrients from the water basin also serves to reduce unwanted algae events in the water basin.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies, and the definition of that term in the reference does not apply.

While certain aspects of conventional technologies have been discussed to facilitate disclosure of the invention, Applicant in no way disclaims these technical aspects. It is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

It is also to be understood that the following claims are intended to cover all of the generic and specific features of the invention herein described, and all statements of the scope of the invention that, as a matter of language, might be said to fall therebetween.

What is claimed is:
1. A water restoration system comprising:
at least one influent conduit having a first end opposite a second end, the first end configured to be disposed within a water basin, the second end in fluidic communication with a filtration chamber;
at least one influent pump fluidically coupled to the at least one influent conduit, the at least one influent pump configured to remove an amount of water from the water basin and into the at least one influent conduit; and the filtration chamber comprising:
a reaction chamber having a top surface opposite a bottom surface and at least one sidewall joining the top surface and the bottom surface, such that the top surface, the bottom surface, and the at least one sidewall together define an interior compartment;
an amount of a filtration media disposed within the interior compartment of the reaction chamber; and
a mixing and aeration chamber having a bottom surface that is disposed below the top surface of the reaction chamber and at least one sidewall joined to the bottom surface of the mixing and aeration chamber to define an interior compartment therein;
wherein the influent conduit is configured to introduce at least a portion of the removed amount of water into the reaction chamber,
wherein the reaction chamber is configured to introduce the filtration media to the removed amount of water,
wherein a portion of the filtration media and a portion of the removed amount of water are configured to be ejected from the reaction chamber;
wherein the filtration chamber is configured to convert the removed amount of water into treated water within the mixing and aeration chamber via aeration from oxygen particles within air surrounding the reaction chamber and via mixing of the filtration media into the amount of water; and
wherein the treated water is configured to be reintroduced into the water basin to continuously treat untreated water within the water basin.

2. The water restoration system of claim 1, further comprising at least one effluent conduit having a first end opposite a second end, the first end configured to be in fluidic communication with the mixing and aeration chamber.

3. The water restoration system of claim 2, further comprising at least one effluent pump fluidically coupled to the second end of the effluent conduit, the at least one effluent pump configured to reintroduce an amount of the treated water into the water basin.

4. The water restoration system of claim 3, wherein the at least one effluent pump is submersible.

5. The water restoration system of claim 1, wherein the at least one influent pump is submersible.

6. The water restoration system of claim 1, wherein the at least one sidewall is discontinuous and defines at least one aperture therethrough proximate to the top surface of the reaction chamber.

7. The water restoration system of claim 1, wherein the top surface of the reaction chamber is a circumferential upper lip such that the reaction chamber defines an open top portion thereof.

8. The water restoration system of claim 1, wherein the second end of influent conduit terminates in a terminal end that is disposed above the bottom surface of the reaction chamber such that there is a gap between the terminal end of the influent conduit and the bottom surface of the reaction chamber.

9. The water restoration system of claim 1, wherein an amount of the filtration media is disposed within the mixing and aeration chamber.

10. The water restoration system of claim 1, further comprising a housing encasing the filtration chamber.

11. A method of treating and restoring a water basin by removing an amount of pollutants therefrom, the method comprising the steps of:
removing an amount of untreated water from the water basin;
ejecting the amount of untreated water into a reaction chamber at a flow velocity;
colliding particles of a filtration media into the amount of untreated water within the reaction chamber;
ejecting the particles of the filtration media and the amount of untreated water from the reaction chamber at a height;
receiving, within a portion of a mixing and aeration chamber that is disposed below the reaction chamber, the particles of the filtration media and the amount of untreated water, such that the particles of the filtration media and the amount of untreated water fall from the height;
aerating, via oxygen particles within air surrounding the reaction chamber and at a surface of the mixing and aeration chamber, the amount of untreated water;
mixing, within the mixing and aeration chamber, the particles of the filtration media with the aerated amount of untreated water, thereby converting at least a portion of the amount of untreated water into treated water; and
reintroducing the treated water into the water basin.

12. The method of claim 10, wherein the amount of untreated water is removed from the water basin via at least one influent pump fluidically coupled to at least one influent conduit configured to eject the amount of untreated water into the reaction chamber.

13. The method of claim 12, wherein the influent pump is submersible.

14. The method of claim 12, wherein the amount of untreated water is ejected into the reaction chamber by the at least one influent conduit at a flow velocity to collide the particles of the filtration media into the amount of untreated water.

15. The method of claim 11, wherein the treated water is reintroduced into the water basin via at least one effluent conduit in fluidic communication with the mixing and aeration chamber.

16. The method of claim 15, wherein the treated water is pulled into the water basin via at least one effluent pump fluidically coupled to the at least one effluent conduit.

17. A method of reducing contaminants in a water basin comprising:
removing an amount of untreated water containing contaminants from the water basin via at least one influent pump fluidically coupled to at least one influent conduit;
ejecting the amount of untreated water from the at least one influent conduit into a reaction chamber at a flow velocity wherein the reaction chamber contains an amount of filtration media;
colliding the particles of the filtration media with the amount of untreated water in the reaction chamber;
ejecting the particles of the filtration media and the amount of untreated water from the reaction chamber at a height into a mixing and aeration chamber disposed below the reaction chamber;
aerating, via oxygen particles within air surrounding the reaction chamber and at a surface of the mixing and aeration chamber, the amount of untreated water;
mixing, within the mixing and aeration chamber, the particles of the filtration media with the aerated amount of untreated water, thereby removing the contaminants and converting at least a portion of the amount of untreated water into treated water; and reintroducing the treated water into the water basin;

wherein the reduction of the contaminants in the water basin reduces formation of undesirable algae bloom events.

18. The method of claim 17, wherein the at least one influent pump is submersible.

19. The method of claim 17, wherein the treated water is reintroduced into the water basin via at least one effluent conduit in fluidic communication with the mixing and aeration chamber.

20. The method of claim 19, wherein the treated water is pulled into the water basin via at least one effluent pump fluidically coupled to the at least one effluent conduit.

* * * * *

UNITED STATES PATENT AND TRADEMARK OFFICE
CERTIFICATE OF CORRECTION

PATENT NO. : 12,116,291 B1  
APPLICATION NO. : 18/668672  
DATED : October 15, 2024  
INVENTOR(S) : Phyl Miller Kimball, Jr.

Page 1 of 1

It is certified that error appears in the above-identified patent and that said Letters Patent is hereby corrected as shown below:

In the Claims

Column 16, Claim 12, Line 27 should read:  
12. The method of claim 11, wherein the amount of Signed and Sealed this  
Twenty-sixth Day of November, 2024

Katherine Kelly Vidal  
*Director of the United States Patent and Trademark Office*